United States Patent
Luo

(10) Patent No.: US 12,423,047 B2
(45) Date of Patent: Sep. 23, 2025

(54) MULTIFUNCTIONAL DOCKING STATION

(71) Applicant: Wenfeng Luo, Shenzhen (CN)

(72) Inventor: Wenfeng Luo, Shenzhen (CN)

( * ) Notice: Subject to any disclaimer, the term of this patent is extended or adjusted under 35 U.S.C. 154(b) by 42 days.

(21) Appl. No.: 18/402,860

(22) Filed: Jan. 3, 2024

(65) Prior Publication Data

US 2025/0217096 A1     Jul. 3, 2025

(51) Int. Cl.
*G06F 3/14* (2006.01)
*G06F 3/02* (2006.01)
*G06F 13/40* (2006.01)

(52) U.S. Cl.
CPC .............. *G06F 3/1454* (2013.01); *G06F 3/02* (2013.01); *G06F 3/1423* (2013.01); *G06F 3/1438* (2013.01); *G06F 13/4081* (2013.01)

(58) Field of Classification Search
CPC ........ G06F 3/1454; G06F 3/02; G06F 3/1423; G06F 3/1438; G06F 13/4081
See application file for complete search history.

(56) References Cited

U.S. PATENT DOCUMENTS

| | | | |
|---|---|---|---|
| 9,237,217 B2 | 1/2016 | Zeung et al. | |
| 10,897,527 B2 | 1/2021 | Ahmed | |
| 10,901,475 B2 | 1/2021 | Volek et al. | |
| 11,561,580 B1* | 1/2023 | Freeman | G06F 1/1632 |
| 2008/0278894 A1* | 11/2008 | Chen | G06F 1/1632 361/679.01 |
| 2011/0248665 A1* | 10/2011 | Smith | C22C 45/10 307/104 |
| 2014/0177153 A1* | 6/2014 | Yu | G06F 1/1632 361/679.41 |
| 2018/0165053 A1 | 6/2018 | Kuo et al. | |
| 2020/0348723 A1* | 11/2020 | Wood, III | G06F 13/385 |
| 2021/0165451 A1* | 6/2021 | Chang | G06F 13/382 |
| 2022/0214732 A1* | 7/2022 | Dai | G06F 1/26 |
| 2023/0018781 A1* | 1/2023 | Choi | G06F 1/1698 |
| 2023/0034925 A1* | 2/2023 | Wong | G06F 1/1632 |
| 2023/0409098 A1* | 12/2023 | Sivaramakrishnan | G06F 1/3253 |
| 2024/0097383 A1* | 3/2024 | Cheng | H01R 13/6683 |
| 2024/0338088 A1* | 10/2024 | Gajiwala | G06F 1/1662 |

* cited by examiner

*Primary Examiner* — Henry Tsai
*Assistant Examiner* — Aurangzeb Hassan

(57) ABSTRACT

Provided is a multifunctional docking station, including: a PCBA board; a first control module, an image input interface and an image output interface which are arranged on the PCBA board; and a function control module, electrically connected to the first control module and sending an acquired operation instruction to the first control module. In a case that the function control module receives an always-on/screen projection instruction and sends the operation instruction to the first control module, the first control module controls image output of the image output interface through a preset program corresponding to the operation instruction so as to control screen projection content.

9 Claims, 4 Drawing Sheets

MULTIFUNCTIONAL DOCKING STATION

TECHNICAL FIELD

The present disclosure belongs to the technical field of electronic devices, and particularly relates to a multifunctional docking station with screen extension and rapid screen projection/always-on functions.

BACKGROUND

A docking station, also known as a port replicator, is an external device specially designed for a notebook computer. The notebook computer can be in one-stop connection with a plurality of accessories or external devices (such as a power adapter, a network cable, a mouse, an external keyboard, a printer and an external display) conveniently by replicating, even extending the port of the notebook computer.

An HDMI video port source in the docking station is connected to a device such as a display. In the screen projection process, when data is searched, to protect privacy, a video transmission line is habitually unplugged and then is plugged again after target data is found, which is inconvenient to use. Data transmission is to be interrupted after the docking station is connected and used. In particular, the screen projection is to be interrupted when the HDMI interface is being subjected to screen projection, it is necessary to unplug the video line. Repeated plugging and unplugging is troublesome, which will lead to too many plugging and unplugging times of the port, resulting in damage and poor human-computer interaction.

In addition, most of the existing docking stations adopt extensions of hardware interfaces and few functional extensions.

SUMMARY

An objective of the present disclosure is to provide a multifunctional docking station for overcoming the shortcomings in the prior art.

To achieve the above objective, the present disclosure provides the following technical solution:

a multifunctional docking station includes:

a PCBA board; a first control module, an image input interface and an image output interface which are arranged on the PCBA board, the image input interface and the image output interface being electrically connected to the first control module, the image input interface being connected to an electronic device for image output, and the image output interface being connected to a screen projection display device; and a function control module, electrically connected to the first control module and sending an acquired operation instruction to the first control module, where in a case that the function control module receives an always-on/screen projection operation instruction and sends the operation instruction to the first control module, the first control module controls image output of the image output interface through a preset program corresponding to the operation instruction so as to control screen projection content.

In some embodiments, the function control module includes at least one of an electronic switch, a mechanical switch, a touch screen, a speech recognition apparatus or a gesture recognition apparatus.

In some embodiments, the docking station further includes a shell, where the shell includes a first shell, and a detachable bottom plate is arranged below the first shell; and the PCBA board is arranged between the first shell and the bottom plate.

In some embodiments, the first shell is provided with a button assembly, and the button assembly is matched with the function control module.

In some embodiments, the button assembly includes an always-on/screen projection switching button.

In some embodiments, the button assembly includes a volume-adjusting button or/and a play content control button.

In some embodiments, a second shell is arranged outside the first shell.

In some embodiments, the image input interface is a Type-C interface, and/or the image output interface is an HDMI interface.

In some embodiments, the PCBA board is further provided with at least one of a USB-extension interface, a network extension interface, a memory card extension interface, an audio interface and a PD/100w input interface. The USB-extension interface includes but not limited to at least one of USB-C and USB-A. The network extension interface includes but not limited to at least one of an LIN interface and a 2.4G interface. The memory card extension interface includes but not limited to at least one of an SD card interface and a TF interface. The audio interface includes but not limited to at least one of an audio input interface, an audio output interface or an MIC.

Compared with the prior art, the present application has the advantages that in the screen projection process, to protect privacy, the screen projection content can be controlled only by triggering an always-on/screen projection button and without unplugging a video transmission line, so that damage to a video transmission port due to too many plugging and unplugging times is avoided, and the human-computer interaction experience is improved.

In addition, the docking station extends a physical interface and is further provided with a plurality of functional buttons, for example, a button for controlling volume and a button for controlling the play content (a previous song, a next song, and pause/play). The functional buttons can further simplify the operation.

BRIEF DESCRIPTION OF THE DRAWINGS

The drawings of the specification that constitutes a part of the present application are used to provide a further understanding of the present disclosure. The exemplary embodiments of the present disclosure and the description thereof are used to explain the present disclosure, and do not constitute an improper limitation of the present disclosure. In the drawings.

Figure 1:
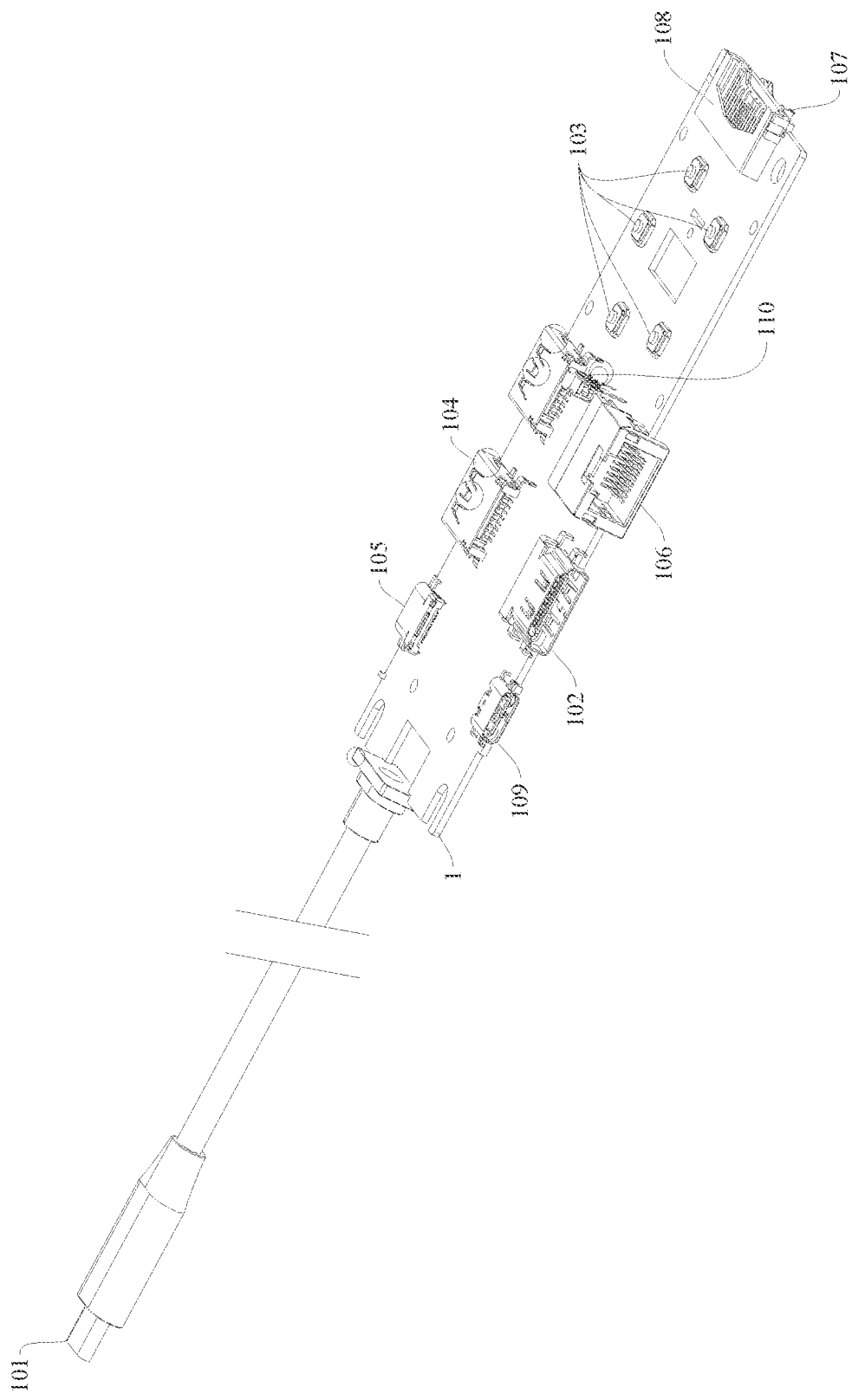
FIG. 1 is a schematic diagram of an overall structure according to an embodiment of the present disclosure.

The reference numerals in the accompanying drawings are as follows: 1—PCBA board; 101—Type-C interface; 102—HDMI interface; 103—electronic switch; 104—USB-A interface; 105—USB-C interface; 106—LIN interface; 107—SD card interface; 108—TF card interface;

109—PD/100w input interface; 110—roller switch; 2—button; 201—always-on button; 202—forward button; 203—back button; 204—pause button; 3—shell; 301—first shell; 302—bottom plate; 303—second shell; 4—roller button; 401—bracket; 402—roller; 403—rolling shaft.

DETAILED DESCRIPTION OF THE EMBODIMENTS

The present disclosure will be described in detail below with reference to the accompanying drawings and in conjunction with embodiments. Various examples are provided by way of interpretation of the present disclosure and are not intended to limit the present disclosure. Indeed, it will be apparent to those skilled in the art that modifications and variations may be made in the present disclosure without departing from the scope or spirit of the present disclosure. For example, features shown or described as part of one embodiment may be used in another embodiment to produce yet another embodiment. Therefore, it is desirable that the present disclosure includes such modifications and variations falling within the scope of the appended claims and their equivalents.

In the description of the present disclosure, the terms "longitudinal", "transverse", "up", "down", "front", "back", "left", "right", "vertical", "horizontal", "top", "bottom" and the like denote orientation or positional relationships based on those shown in the drawings and are intended for ease of description only and not to require that the present disclosure is necessarily constructed and operated in a particular orientation and therefore cannot be construed as limiting to the present disclosure. The terms "connection", "connect" and "set" used in the present disclosure should be understood in a broad sense, for example, which may refer to a fixed connection or a detachable connection; which may refer to a direct connection or an indirect connection through intermediate components; which may refer to a wired electrical connection, a radio connection, or a wireless communication signal connection, and the specific meanings of the above terms may be understood by those of ordinary skill in the art according to a specific situation.

One or more examples of the present disclosure are shown in the accompanying drawings. The detailed description uses numeric and letter marks to refer to features in the drawings. Similar or like reference signs in the drawings and descriptions have been used to refer to similar or like parts of the present disclosure. As used herein, the terms "first", "second" and "third" and the like are used interchangeably to distinguish one member from another and are not intended to denote the location or importance of individual members.

Figure 2:
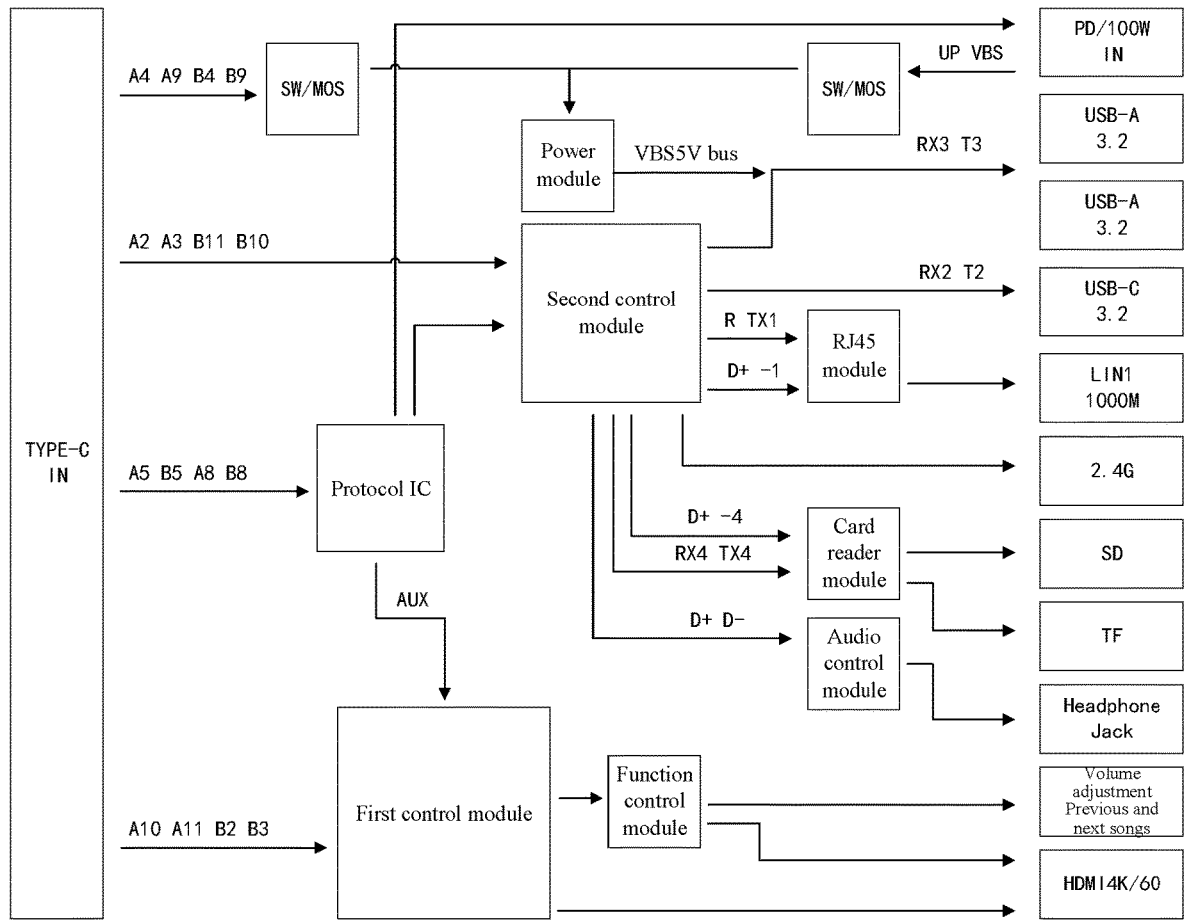
FIG. 2 is a schematic diagram of a circuit structure according to an embodiment of the present disclosure.

As shown in FIG. 1 and FIG. 2, according to the embodiment of the present disclosure, a multifunctional docking station for screen extension is provided. The docking station of the present application can project an image of an electronic device to other screen devices. For example, it is common to project an image of a notebook computer on a display or a projector. The shortcomings in the prior art have been described in the background art. In a case that the content of screen projection is to be shielded, a data line connected to a screen device is generally disconnected, for example, the data line is unplugged from the docking station, or a display device is turned off. The above method is very inconvenient to operate and will lead to too many plugging and unplugging times of the port, resulting in damage and poor human-computer interaction.

The technical solution of the present application is to control the content of screen projection by a function button of the docking station.

The multifunctional docking station includes a PCBA board 1; and a first control module, an image input interface and an image output interface are arranged on the PCBA board 1. The image input interface is connected to the electronic device for image output, for example, a computer and a mobile phone. The image output interface is connected to a screen projection display device, for example, a display and a projector. The image input interface and the image output interface are electrically connected to the first control module. The multifunctional docking station further includes a function control module for acquiring an operation instruction. The function control module is electrically connected to the first control module and sends the acquired operation instruction to the first control module. The function control module includes an electronic switch 103, a mechanical button 2, a touch screen, a speech recognition apparatus or a gesture recognition apparatus.

Figure 3:
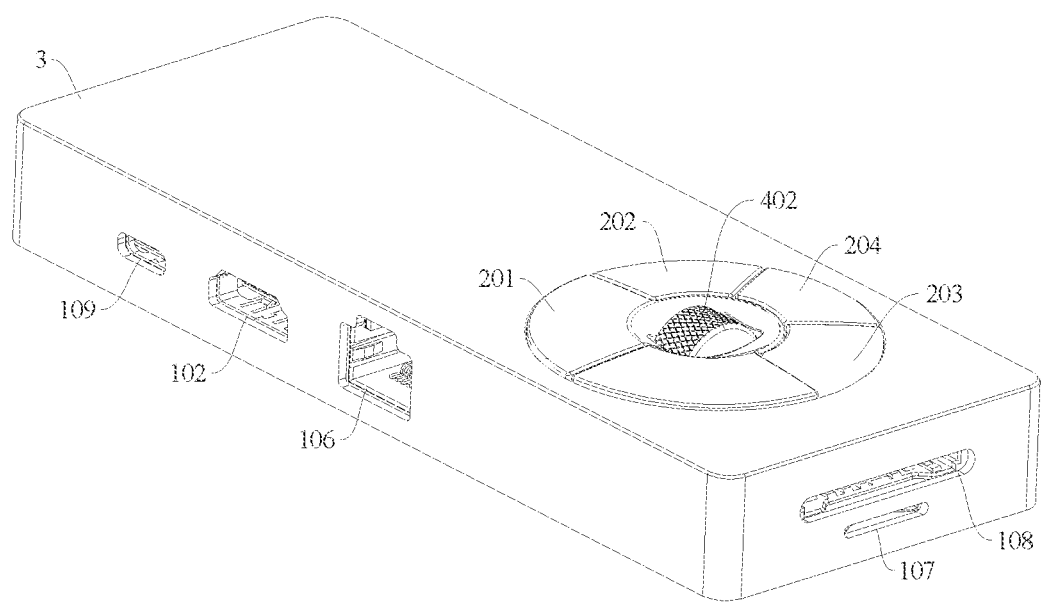
FIG. 3 is a schematic diagram of a three-dimensional structure according to an embodiment of the present disclosure.
Figure 4:
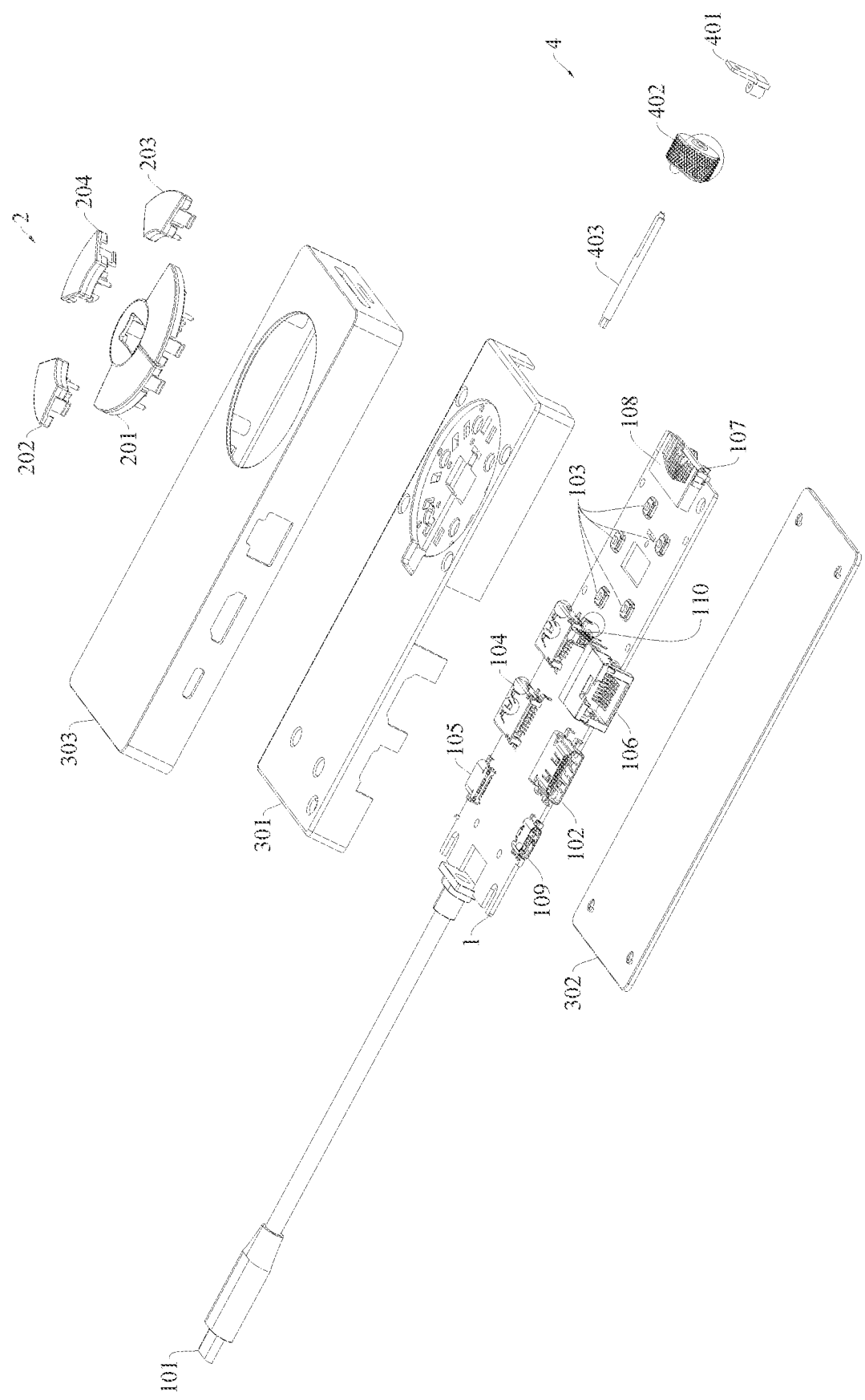
FIG. 4 is an exploded view of FIG. 3.

Specifically, referring to FIG. 3 and FIG. 4, the multifunctional docking station includes a shell 3; the shell 3 includes a first shell 301; and a detachable bottom plate 302 is arranged below the first shell 301. The PCBA board 1 is arranged in the first shell 301, and the first control module is arranged on the PCBA board 1. An image input interface is formed in a side surface of the first shell 301. In this embodiment, the image input interface is a Type-C interface 101. An image output interface is formed in the PCBA board 1. In this embodiment, the image output interface is an HDMI interface 102; and an electronic switch 103 is arranged on the PCBA board 1 and configured to receive the control operation instruction. Accordingly, the first shell 301 is provided with an opening matched with the HDMI interface 102, and a button 2 matched with the electronic switch 103. The Type-C interface 101, the HDMI interface 102 and the electronic switch 103 are electrically connected to the first control module.

When the docking station of the present application is used, the Type-C interface 101 is connected to the computer, and an externally extended display is connected to the HDMI interface 102 through an HDMI cable. The computer projects the image on the display through the docking station. In a case that the content of screen projection is required to be shielded, the button 2 can be touched, the electronic switch 103 sends the received instruction to the first control module, and the first control module controls the image output of the HDMI interface 102 through a preset program so as to control the content of screen projection.

According to the shielding method, it is unnecessary to plug and unplug the data line or turn off the display, so that the plugging and unplugging times of the interface are reduced and the human-computer interaction experience is improved. Furthermore, in the shielding process, physical connection is still kept, so that when screen projection and shielding are switched, the delay is shorter and the experience is better.

In addition, in some embodiments, the multifunctional docking station is further provided with more function instructions, for example, adjusting the volume and controlling the play content (for example, the previous song, the next song, the previous page, the next page and pause). Specifically, several electronic switches 103 are provided, where at least one of the electronic switches is configured to control always-on, and the others are configured to control the play content. The button 2 is accordingly provided with an always-on button 201, a forward button 202, a back button 203, a pause button 204 and the like. In this embodiment, the volume is controlled by a roller switch 110. Accordingly, a roller button 4 is provided and includes a bracket 401 and a roller 402; and the roller 402 is connected between the bracket 401 and the roller switch 110 through a rolling shaft 403.

In some embodiments, to increase the functions of the docking station, the docking station of the present application is further provided with a USB-extension interface, a network extension interface, a memory card extension interface and an audio interface.

Specifically, the PCBA board 1 is provided with a second control module, a USB-A interface 104, a USB-C interface 105, an LIN interface 106, a 2.4G interface, an SD card interface 107, a TF card interface 108 and a headphone jack interface. The USB-A interface 104 and the USB-C interface 105 are electrically connected to the second control module; the LIN interface 106 is electrically connected to the second control module through an RJ45 module; the 2.4G interface is electrically connected to the second control module; the SD interface and the TF interface are electrically connected to the second control module through a card reader module; and the headphone jack interface is electrically connected to the second control module through an audio control module.

The PCBA board 1 is further provided with a PD/100w input interface 109, and the PD/100w input interface 109 is electrically connected to the USB-A interface 104 through a power management module.

In some embodiments, the audio interface is not limited to the headphone jack interface, and the audio interface includes audio input and output.

In some embodiments, a second shell 303 is arranged outside the first shell 301. There is no mounting trace on the second shell 303, so the multifunctional docking station is easier in daily cleaning.

The foregoing is merely a preferred embodiment of the present disclosure and is not intended to limit the present disclosure which may be subject to various modifications and variations to those skilled in the art. Any modification, equivalent replacement, improvement, etc. made within the spirit and principles of the present disclosure should be included in the scope of protection of the present disclosure.

What is claimed is:

1. A multifunctional docking station, comprising:
   a printed circuit board assembly (PCBA) board; a first control module, an image input interface and an image output interface which are arranged on the PCBA board, the image input interface and the image output interface being electrically connected to the first control module, the image input interface being connected to an electronic device for image output, and the image output interface being connected to a screen projection display device; and
   a function control module, electrically connected to the first control module and sending an acquired operation instruction to the first control module, and the function control module comprising a button assembly and an electronic switch;
   wherein in a case that the function control module receives an always-on/screen projection operation instruction and sends the operation instruction to the first control module, the first control module controls image output of the image output interface through a preset program corresponding to the operation instruction so as to control screen projection content; and
   wherein in response to the operation instruction being a shielding instruction, the button assembly is touched and the electronic switch sends the shielding instruction to the first control module for controlling shielding of the image output of the image output interface through the preset program, and a physical connection between the image output interface and the screen projection display device is kept.

2. The docking station according to claim 1, wherein the function control module further comprises at least one of a touch screen, a speech recognition apparatus or a gesture recognition apparatus.

3. The docking station according to claim 1, further comprising a shell, wherein the shell comprises a first shell, and a detachable bottom plate is arranged below the first shell; and
the PCBA board is arranged between the first shell and the bottom plate.

4. The docking station according to claim 3, wherein a second shell is arranged outside the first shell.

5. The docking station according to claim 1, wherein the button assembly comprises an always-on/screen projection switching button.

6. The docking station according to claim 1, wherein the button assembly comprises a volume-adjusting button or/and a play content control button.

7. The docking station according to claim 1, wherein the image input interface is a Type-C interface, and/or the image output interface is an high-definition multimedia interface (HDMI) interface.

8. The docking station according to claim 1, wherein the PCBA board is further provided with at least one of a USB-extension interface, a network extension interface, a memory card extension interface, an audio interface and a power delivery 100 watt (PD/100w) input interface.

9. The docking station according to claim 1, wherein the PCBA board is provided with a second control module, a universal serial bus Type-A (USB-A) interface, a universal serial bus Type-C (USB-C) interface, a local interconnect network (LIN) interface, a 2.4 gigahertz wireless (2.4G) interface, a secure digital (SD) card interface, a transflash (TF) card interface, and a headphone jack interface; and
the USB-A interface, the USB-C interface, the LIN interface, the 2.4G interface, the SD interface, the TF interface, and the headphone jack interface are electrically connected to the second control module.

* * * * *